Figure 1:
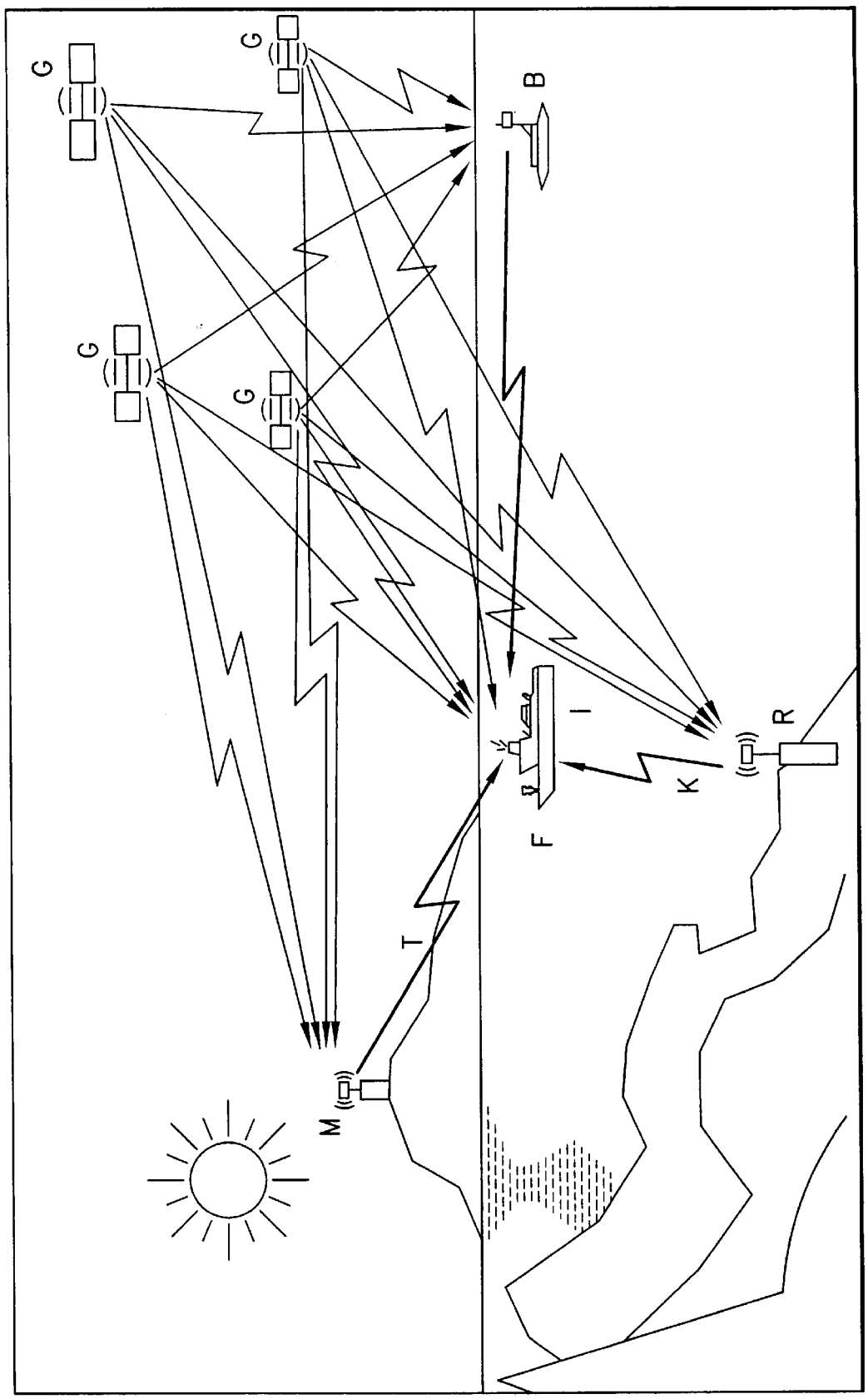

United States Patent [19]
Vigen

[11] Patent Number: 5,910,789
[45] Date of Patent: Jun. 8, 1999

[54] METHOD FOR INTEGRITY MONITORING IN POSITION DETERMINATION

[75] Inventor: Erik Vigen, Hønefoss, Norway

[73] Assignee: Geco A.S., Stavanger, Norway

[21] Appl. No.: 08/849,257

[22] PCT Filed: Dec. 20, 1995

[86] PCT No.: PCT/NO95/00239

§ 371 Date: Aug. 28, 1997

§ 102(e) Date: Aug. 28, 1997

[87] PCT Pub. No.: WO96/21163

PCT Pub. Date: Jul. 11, 1996

[30] Foreign Application Priority Data

Dec. 20, 1994 [NO] Norway .................................. 944954

[51] Int. Cl.⁶ .................................................. G01S 5/02
[52] U.S. Cl. ........................................................ 342/357
[58] Field of Search ........................... 342/357; 701/214, 701/215

[56] References Cited

U.S. PATENT DOCUMENTS

| | | | |
|---|---|---|---|
| 4,809,005 | 2/1989 | Counselman, III | 342/352 |
| 5,252,982 | 10/1993 | Frei | 342/357 |
| 5,436,632 | 7/1995 | Sheynblat | 342/357 |
| 5,504,492 | 4/1996 | Class et al. | 342/357 |

FOREIGN PATENT DOCUMENTS 221339 8/1989 United Kingdom .............. G01S 5/10

OTHER PUBLICATIONS

Mark A Sturza, *Navigation System Integrity Monitoring Using Redundant Measurements*, Navigation: Journal of The Institute of Navigation, vol. 35, No. 4, Winter 1988–1989, pp. 483–501.

*Primary Examiner*—Gregory C. Issing
*Attorney, Agent, or Firm*—William B. Batzer; Keith G. W. Smith; David Garrod

[57] ABSTRACT

In a method for integrity monitoring in position determination by means of the Global Positioning System (GPS), especially by means of differential GPS (DGPS) or multi-station DGPS, wherein there is employed a monitor station (M) with a first GPS receiver, provided at a location with a known geographical position, GPS-based position measurement results are transferred on a communication line from the monitor station (M) to a user location (F) the integrity of whose geographical position has to be monitored by means of a second GPS receiver provided at the location (F). A space vector between the location of the monitor station (M) and the location (F) is determined by means of the position measurement results for the location (F) and the monitor station (M), whereupon the degree of agreement is determined between the position for the location (F), the space vector and the known position of the monitor station (M), the degree of agreement being required to correspond to a maximum error in the position for the user location (F).

10 Claims, 2 Drawing Sheets

METHOD FOR INTEGRITY MONITORING IN POSITION DETERMINATION

The invention concerns a method for integrity monitoring in position determination by means of the Global Positioning System (GPS), especially by means of differential GPS (DGPS) or multi-station DGPS, wherein a monitor station is employed with a first GPS receiver provided at a location with a known geographical position.

It is normally desirable to have a high degree of certainty that a navigation aid really provides a performance which lies within the expected range of accuracy. A standard method is to employ a surplus of measurements in order to verify this, e.g. by means of statistic test methods. When using GPS this excess is dependent on the number of satellites which are visible to the user at any time, which at times means that the control of surplus measurements is reduced. The typical navigation user will have to compensate for this by employing greater safety margins which can lead to disadvantages and increased costs.

In the context of entrepreneur activity where fixed measured points do not exist within reasonable proximity such as offshore, for activities such as, e.g., the acquisition of seismic data or pipe laying, it will be of great economic importance to be able to verify the reliability of the positioning system within the same tolerance independent of the number of available satellites.

A method is proposed herein which will make this kind of integrity monitoring possible.

At present GPS is in the process of developing into a universal navigation system for use onshore, at sea and in the air. The system is owned by the US authorities and is placed at the disposal of all users who acquire a GPS receiver. The system is therefore very inexpensive for the user. Moreover the system has a global coverage which is quite unique in comparison with previous systems, while at the same time it offers the possibility of performing extremely accurate position determination.

GPS will therefore be the natural choice of navigation system in the future for most people who require to navigate.

It is highly desirable that the necessary control of the GPS application can be verified without incorporating extra systems since these will usually have a limited range of coverage as well as increasing the costs and thereby losing many of the advantages of using GPS.

A typical demanding application of GPS position determination is in connection with the acquisition of marine seismic data. In this field so-called differential GPS is used in which correction data is broadcast from measuring stations located at known points. By utilizing these corrections the accuracy can be substantially improved and this kind of application is typical for accuracy requirements in the range 0.5–10 meters. In seismic data acquisition it is also normal practice to have buoys deployed in the water and these may also by towed by a vessel. The position of the buoys is also required to be known with a high degree of accuracy, and GPS is also a suitable system for performing such a determination. In this case a relative determination is made between, e.g., the boat and the buoy concerned.

The fact that both a high degree of accuracy is required here and simultaneously a high degree of certainty that the actual performance should agree with the estimated or expected performance makes integrity monitoring extremely demanding. There is a requirement that errors which are not appreciably greater than the noise in the system should be detected and rendered harmless. The economic risk involved in faulty positioning of geological information and constructions is formidable. The proposed method will be an aid to solving this problem.

The use of a navigation system will always be encumbered with errors. The coincidental errors, i.e. random noise, are relatively harmless in this connection. The level of this noise is generally used to describe the accuracy of a system, and in the case of GPS the level of this noise is low. Such errors are easily dealt with by recognized calculation algorithms based on the least squares method or Kalman filtering.

Since the noise level in GPS is low the error picture is dominated to a greater extent than for many other systems by model errors which usually take a systematic course. Systematic errors of this kind can have a very unfortunate effect on the position determination performed by algorithms of the above-mentioned type. Great emphasis is therefore placed on detecting and removing such errors prior to the position determination. Model errors should be understood here to mean deviations between the mathematic model, on which the performance is based, and the real physical conditions which prevail during use.

GPS is a comprehensive system and the possible sources of error are therefore also many. The system is often considered on the basis of 3 main components:

a space segment, i.e. satellites a control segment, i.e. ground stations and control centres which are responsible for daily operation of satellites and signals a user segment, i.e. the user's receiver system with antenna and software.

Errors can occur in the space segment in connection with, e.g., power supply, antennae, clocks, stability, etc. Such conditions will normally result in the satellite becoming unusable rather than introducing small errors which the user has trouble in detecting. The control segment monitors the satellites with regard to such errors and by using the satellite signals will warn the user about the condition. Of course it cannot be ruled out that an error with relatively little effect can occur here, with the result that the warning to the user arrives too late or not at all. The reporting mechanism which is employed can also cause it to take many minutes, and perhaps as much as an hour, between the detection of the error and notification of the users.

In addition to monitoring of the satellites the control segment will perform measurements which will form the basis for calculating updated satellite orbits and clock operation. These data are programmed into each individual satellite of the control segment. There are, of course, many details which potentially can go wrong during this process, e.g. operator error, software error, error in connection with uploading of data and programmes to the satellites, measurement error on the ground stations as well as during transfer of these data to the control centre etc. The control segment works under stringent requirements with regard to procedures with continuous quality improvement. Even though it cannot be ruled out that errors can also occur in this part of the process it is probably not the most conspicuous source of error.

In the user segment on the other hand the possibilities for error are many and the possibilities for detecting them correspondingly limited. Examples of errors which may arise are as follows:

receiver error software error measurement error as a result of phase error on account of multiple-path interference deviation in signal path as a result of ionospheric and tropospheric refraction.

If differential GPS is employed the effects will also be felt of corresponding errors in the reference stations which are in use and the transfer of correction data therefrom.

The first three types of error are cumulative, while the last is reduced to some extent by the fact that the error is common to the reference stations and the user, but this will be dependent on the distance between them.

Thus it is the duty of the user to protect himself against any remaining errors from the space segment and the control segment in addition to the user segment-oriented error sources. In the case of differential use combatting the so-called "Selective Availability" (SA) will also take a similar form to the normal error sources. Intentional errors are built into SA in GPS in order to prevent unauthorized users from achieving ultimate accuracy. The unauthorized user naturally obtains no information on what the errors are, but information is supplied on what he can expect. The integrity control in relation to this will thereby take the form of an investigation into whether one is more influenced by SA than by "what can be expected".

To sum up briefly it can be said that if the user does not check the system in relation to these and other possible error sources he does not know what performance it gives, and the result is that he is using an unreliable navigation system. The conscientious user must therefore have a method available in order to perform such a check.

The most common method for integrity monitoring is based on the use of statistical hypothesis testing. The initial hypothesis selected is normally that all measurements are distributed according to a known statistical distribution, usually normal distribution. It is then tested against a number of alternative hypotheses, in each of which there is assumed a specific error pattern. Standard alternative hypotheses are the occurrence of only one error at a time which leads to testing of as many alternative hypotheses as there are measurements.

The weaknesses of the method consist in the fact that if the error pattern which actually occurs in a given error situation does not form part of any of the alternative hypotheses, it is not certain that the error can be detected. Moreover it is a purely statistical method where a given error only has a probability of being detected and identified. In other words there is also a certain probability that an error will avoid detection. These probabilities are influenced to a great extent by the ratio between measuring accuracy and the size of the error against which protection is required. The method begins to be highly impractical for most applications when the ratio approaches 1:5, but there is no absolute limit. This practical limit is in turn very dependent on geometrical strength in the position determination, since the poorer the geometry the less the probability of detecting a given error.

The principle is based on control of the agreement of the measurements. If there is only one surplus measurement it will only be possible to detect that one error exists, but it is impossible to isolate it by means of this method. Thus it also becomes clear that if there is no surplus measurement, the entire agreement will become meaningless and errors cannot be detected.

The problem with an insufficient surplus of measurements or poor geometry can be remedied by combining GPS with other systems.

GLONASS is a Russian satellite navigation system which works on the same principle as GPS. This will double the number of satellites available and is thereby expected to remedy this detail. The drawbacks with this method are associated in the short term with the availability of receiver equipment for GLONASS signals. Present day receivers are expensive compared with GPS receivers. In the longer term there is a degree of uncertainty with regard to the availability of GLONASS signals.

INMARSAT is in the process of launching new versions of its communication satellites. These have an inbuilt function enabling them to transmit signals in approximate GPS format. These signals will carry additional information concerning the condition of the GPS satellites, but are also intended to be used to make additional measurements, and thus the effect will be the same as if there were an extra GPS satellite available. This will make 1–3 extra measurements available, thus ensuring a higher minimum number of measurements. The disadvantage is that these signals are not yet available. Moreover it is worth noting that the satellites travel in geostationary orbits, which leads to a gradual deterioration in the coverage at higher latitudes and it becomes unavailable in the Arctic and Antarctic. Signals from satellites with a low angle of elevation are generally of poor quality due to the effects of refraction. Another phenomenon which can occur due to the fact that all these satellites lie on the same plane is that if the available GPS satellites should also happen to lie close to the same plane, the extra measurements will not provide any significant contribution to the geometry.

Inertial navigation systems will also contribute with additional measurements, but of a different kind. These systems are not sensitive to fixed or slowly varying position errors, and are therefore unable to assist in exposing them. Moreover there is a substantial cost consideration to be taken into account when using inertial platforms.

The above methods have the advantage that they all focus on the integrity of the user's position estimate which is the important factor in this context, but it can be problematic to strike a suitable balance between low probability of false alarm and high probability of detection. Low probability of false alarm also affords low probability of detection and vice versa.

By providing a GPS receiver at a known point it will be possible to express with much more certainty the reliability of the system, and any errors can be demonstrated with a greater degree of certainty. This is a recognized principle for a so-called monitor station. If an application of differential GPS requires to be checked, this station can be supplied with the same differential corrections as the user receives. As long as this monitor determines its own position with a degree of error which is less than that against which protection is desired, it will be assumed that there is no error in the system. As soon as the error limit is exceeded the monitor will transmit a warning to the user via a communication channel suited to the purpose. This can often be arranged in such a manner that the warning is transmitted to the closest reference station which then passes it on to the user together with the broadcast of differential corrections. The user will thereby be able to receive the warning within a few seconds.

However, this system has a substantial weakness in that the user's own measurements do not form part of the control. As indicated in the introduction it is at this point that there is the greatest probability of errors occurring.

The object of the invention is to provide a method which eliminates the disadvantages of known methods of integrity monitoring, this object being achieved by transferring GPS-based position measuring results on a communication line from the monitor station to a user location whose integrity will be monitored by means of a second GPS receiver provided at the location, to determine a space vector between the location of the monitor station and the location by means of the position measuring result for the location and the known position of the monitor station, and to determine the degree of agreement between the position of the location, the space vector and the known position of the monitor station, the degree of agreement being required to correspond to a maximum error in the position of the user location.

It is proposed to employ a GPS receiver positioned at a known point in the same manner as for the position monitor described above, but the measurements which this performs are used in a different way.

It is recommended that integrity monitoring by means of hypothesis testing should always be used, since the only drawback this entails is that sufficient calculating power must be made available in order to perform the calculations continuously. The proposed method will constitute a more stringent extra control, and its greatest importance will naturally lie in filling in the gaps in the first method.

Quite simply, the method is based on the fact that the monitor station transmits its measurement results to the user via a communication line suited to the purpose. The user can then combine these measurements with his own in order to determine a space vector between himself and the monitor station.

The user will then be able to check that there is agreement between his own position, which requires to be controlled, the determined space vector and the monitor's known position. The user has previous knowledge of the monitor's exact position. The discrepancy which can be tolerated can be set as being equal to the position error against which protection is desired. The position gap can be determined by means of a simple solid geometric observation or by geodetic calculations.

The method is particularly well suited to a vessel for marine seismic data acquisition which also uses GPS as a navigation aid. This will be shown in the following description, but the method is not restricted to this area of application. This special application, however, is the basis for the further detailed description.

Figure 2:
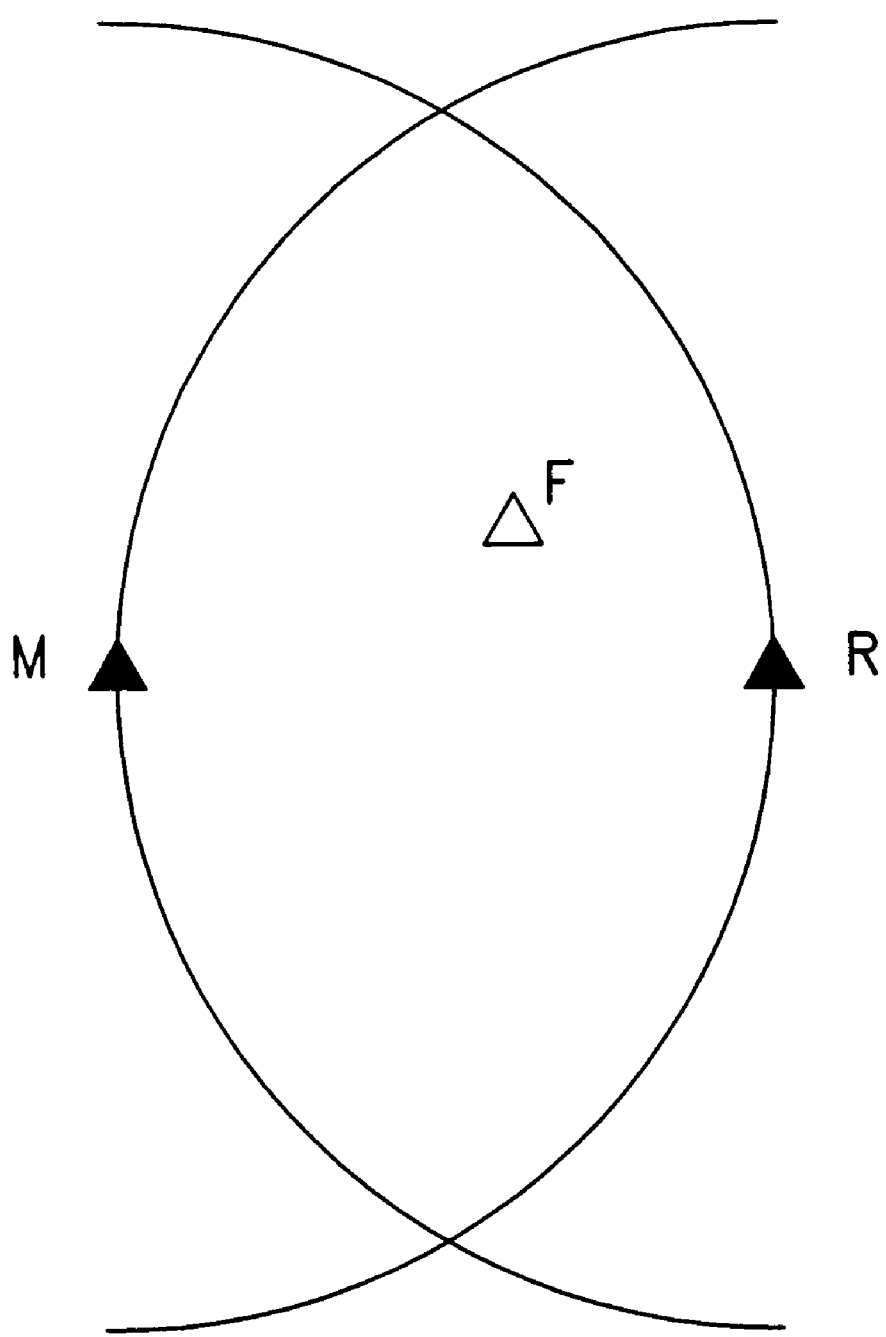

The invention will now be explained in more detail with reference to the drawing, wherein FIG. 1 illustrates a relevant navigation situation with position determination, and FIG. 2 an example of the siting of a monitor station in relation to user location and one or more reference stations.

FIG. 1 illustrates how a vessel F navigates by means of signals from GPS satellites G combined with differential corrections broadcast via a broadcasting medium K from one or more reference stations R which are arranged in known position(s). The vessel F which is equipped with a GPS receiver together with a receiver for the broadcasts from the reference station(s) R performs the navigation by means of so-called differential GPS (DGPS) which is a known method.

The vessel F tows one or more buoys B whose position is determined relative to the vessel F by a suitable GPS-based technique. For this purpose the buoy(s) B is equipped with a GPS receiver and the equipment required for telemetering measurement data for the vessel F.

As shown in FIG. 1, a GPS receiver has been provided in a monitor station M at a co-ordinate-determined point. In addition the monitor is equipped with the necessary equipment for communicating via a suitable medium T with the vessel F. It is also desirable for the vessel F to be equipped with an extra GPS receiver in a secondary measuring station I on board. The reason for this is described below in connection with the method.

The vessel determines its own position by means of signals from the satellites G and the reference station(s) R according to the method for differential GPS (DGPS). The space vector from the vessel F to (each of) the buoy(s) B is determined by means of the same signals from the satellites G observed from F and from B. The measurement results from the observation of the signals on board B are transferred to F through the established telemetry channel. Both sets of measurements are transferred to a computer on board the vessel F. The measurement differences between F and B for the same satellites provide a data set which indicates distance and clock error differences between F and B in relation to each of the satellites G concerned. On the basis of known GPS technique it is then a commonplace task to derive the space vector and the clock difference between F and B.

The problem now is how the integrity of this position determination can be monitored if none of the known methods mentioned above is adequate. First and foremost the problem is relevant to the position determination of F since the use of buoys is restricted to special operations such as seismic data acquisition;

in the case of seismic data acquisition the integrity of the buoy(s) will also be controlled by means of other necessary (underwater) positioning systems such as, e.g., hydroacoustic measurements and magnetic compasses.

The integrity monitoring of the position determination for F can be performed by transferring measurements from the monitor station M to the vessel F by means of the communication connection T. The information which is transmitted from M to F is of exactly the same type as that which is normally transmitted from B to F. The measurements F received from M are entered into the same computer as mentioned above. Thereupon exactly the same calculation is performed for the monitor M as that which is performed for the buoy(s) B. This means that a space vector is determined between F and M. If all measurements, differential corrections, data transfers, calculation models and software programmes are correct, the vessel's F position together with the space vector will be able to generate a position for the monitor M which agrees with the previously known coordinates for M. This position can be calculated by means of a solid geometric observation or by a geodetic calculation.

It should be noted here that the determination of the space vector between F and M is performed completely independently of the reference station(s)' R measurements and its (their) calculated differential corrections. A complete control is thereby obtained of the DGPS infrastructure as it appears to the user. This is a distinct improvement in relation to the above-mentioned position monitor which is installed at a different location from the user and operates under independent conditions. The proposed method does not appear to have any weaknesses in relation to the prior art.

There is, however, a weakness in relation to the problem of monitoring the integrity of the vessel's F position. Theoretically it is quite possible to generate a correct position for M according to the described method even though the position for F has a moderate error. This situation can arise if there is a measurement error in the observation of the satellite signals from the satellites G on board F. These measurements are used both to obtain the position for F and to determine the space vector between F and M. On closer consideration it will be revealed that these two elements will be encumbered with equally substantial errors from any measurement error of this kind. The effect on position and space vector respectively will have opposite signs, thereby cancelling the error when the position for M is derived. However, this problem is easily remedied by arranging an additional GPS receiver I on board F. Duplication of the receiver and antenna system will provide direct protection against errors in this equipment, but if the antennae are located at a distance from each other which is sufficient to achieve reasonably independent observation conditions (e.g. 5 meters or more), this will also provide an efficient protection against multiple-path interference which is considered to be the most frequently occurring source of error for a GPS user. Like the measurement from M the measurements performed by I are entered into the computer, and a space vector is calculated in a similar fashion. This space vector can then be compared with the known vector which can be measured between the antennae on board by other means, e.g. by a tape measure and use of the vessel's F navigation compass.

One of the greatest sources of error in connection with DGPS is refraction of the GPS signals through the ionosphere. The variations in this effect are great enough to introduce substantial errors in relation to generally known models of this effect. Potentially this could lead to an integrity problem if there are stringent requirements. The simplest way of avoiding this is to use two-frequency GPS equipment. Equipment of this kind is much more expensive for the user. Moreover all publicly available reference station services of any extent are based only on single-frequency equipment, thus eliminating much of the benefit. There is of course nothing to prevent both the monitor station M and the vessel F from being equipped with two-frequency equipment, thus permitting a more accurate vector to be determined virtually unaffected by ionospheric errors. In this case an even more efficient integrity monitoring would be achieved. However, another proposal is presented here which enables this increase in costs to be avoided.

The influence of the ionosphere on the GPS signals is correlated over relatively great distances (>1000 km). This is exploited to the advantage of DGPS as any remaining errors are largely cancelled between reference station and user. However, it is the integrity of this detail which has to be monitored since it is based on a statistical assumption. By positioning the monitor station M in relation to the user F and the reference station(s) R in such a manner that the distances F-M and F-R are less than M-R, the advantage is achieved that the expected correlation between F and M is greater than between R and M. This fact makes the vector F-M suitable for checking the accuracy of the ratio between R and F. See FIG. 2 of the drawing.

The chosen position of the monitor M in relation to the reference station R provides a favourable operational area for the vessel F which is defined by the two circular arcs with centres in the points M and R respectively and with radius equal to the distance between M and R.

If a network of reference stations R is employed, in order to make optimum use of DGPS with regard to accuracy it will normally be desirable to arrange the reference stations R in a circle around the operational area for the vessel F. Unless the extent of the network of R is extremely large (e.g. considerably larger than 1000 km), ionospheric refraction will no longer be a great threat. In the case of such a network of R, within which F operates, and regardless of size, the optimum position for M will be located within the same network, but then the condition illustrated above naturally cannot be fulfilled for all reference stations at the same time. On the basis of a pure consideration of integrity it will be best to have M as close to F as possible, but this is not really critical.

The best way of performing the control is to have the position of the monitor station continuously estimated by the computer which also compares the estimate with the known coordinates. In its simplest form it can be performed in such a manner that the computer transmits an alarm to the user when a predetermined limit for position error is exceeded. It should thereby be possible to expose errors which are less significant than those detected by utilizing the statistic hypothesis testing alone.

Nor is there any reason why the method of hypothesis testing should not be extended to also help to find the error source after a significant error vector has been detected by means of the monitor's measurement data. The actual hypothesis formulation will then have to be modified in order to utilize the knowledge obtained by including the monitor, but the object will be the same, viz. to find the most probable error measurement in order to remove it. A major advantage of this method in relation to that described above is that identification is possible even though the vessel F does not have access to any surplus measurements apart from those the monitor has performed. A natural consequence if F is already operating with a minimum number of measurements is that it is only possible to expose and correct the error in the measurement value, but there is then no longer a sufficient number of correct measurements to generate a correct position.

Depending on the kind of communication connection which exists between the monitor M and the vessel F, there are at all events two strategies to choose between for the use of integrity monitoring according to this method. In the case of a relatively expensive connection; its use can be limited to those periods where alternative methods do not work satisfactorily. A second strategy can be to perform random sampling for short periods. An alternative method which can be recommended if it is not too expensive, is to maintain continuous connection with the monitor, thus making full use of the integrity monitoring according to this best method.

It will presumably be natural to utilize the GPS receiver I all the time since it is installed in any case, and no additional costs are incurred when it is used. This will provide protection against multiple-path interference which, as already mentioned, is a frequently occurring source of error.

If the position determination has to be referred to a different datum than that which, e.g., GPS employs, it will be necessary to perform a datum transformation. By means of the method according to the invention the integrity of the datum transformation can be monitored. Otherwise it is generally extremely difficult to verify a datum transformation, leading to one of the most frequently occurring navigational errors in present day use of satellite-based navigation. By employing integrity monitoring according to the present invention, therefore, navigational errors during datum transformation can be eliminated independently of which datum the transformation is based on and of which datum reference is desired.

The method has a number of advantages, some of which are most pronounced in connection with marine seismic operations or the like.

The "integrity gaps" which exist in previously known methods can be filled.

The integrity monitoring becomes more complete due to the fact that the user's system is a necessary and integral element of the method. In other words, all known and perceived errors and error effects of importance for the application are monitored.

The monitoring is carried out on board where the user has access to all the material used in the control.

Since the user's ordinary software for position calculation and space vector calculation is employed as the central elements in the integrity control, an additional benefit is obtained in that this software is verified simultaneously. This is of great practical importance for marine seismic operations where there is often a requirement for such verification before the vessel leaves port.

The method is flexible with regard to choice of communication method T between the monitor M and the vessel F.

Since the monitor M in principle performs the same operation as the buoy(s) B it is an extra "bonus" to be able to use the same receiver unit. Such a unit is developed to be capable of operating on a buoy over a substantial period without intervention from any operator, and it can be remotely operated to a certain extent. By using the same type of unit a standardization of the equipment is achieved which simplifies use, and it also has the advantage that any integrity problems are exposed with this unit which is used for all space vector determination in the system.

It will be advantageous to couple a modem to the unit located in the monitor station M. This makes the communication with M from the vessel F very flexible, since any telephone connection of reasonable quality can be used. Thus a vessel in port or near the coast can use mobile telephone connection as a reasonable communication method. Beyond this range communication via INMARSAT can be employed. This is of course an expensive connection, and it can be desirable to restrict the use to those periods when it is strictly necessary. It will be possible for some seismic vessels to have fixed telephone lines to shore through NORSAT B satellite communication or the like. If such lines have available capacity this will naturally permit the integrity monitoring to be implemented in a very reasonable fashion.

If more than one vessel has to be capable of utilizing the monitor simultaneously it will be desirable to couple up more modems to the receiver unit in the monitor station. This can be done by splitting the RS232 line from the receiver unit to the modem and distributing it to more modems which then can each have its own telephone line. Standard equipment exists for performing this task.

The method is flexible with regard to the position of the monitor station M. It will therefore be possible to choose a location where the costs of installation are minimal. This may, e.g., be at an operations office within, e.g., a distance of 1000 km from the vessel's F operational area. Other examples of where electricity and telephone lines are conveniently accessible may be hotels in large towns if operations are being conducted in distant locations.

It should be understood that the method according to the invention can be used with other communication methods and concepts than those described here. The vessel's measurements can instead be transferred to the monitor station which then performs the analysis. Otherwise all the data can be transferred to a central location where the analysis is performed. Other positions and/or vectors can be calculated on the basis of similar measurement stations for comparison and control. Nor is it necessary for the vessel to navigate by means of GPS or DGPS, as other navigation systems can be employed for position determination. The method according to the invention can also be employed in other connections than marine seismic exploration, for navigation on land or in the air, and with modifications for more than one monitor station. Moreover the method can also be employed in a similar manner for GLONASS and/or other similar navigation systems. Thus it should be understood that the above-mentioned and other applications which will be obvious to a person skilled in the art, are considered to fall within the spirit and scope of the invention.

Implementation of such an integrity monitoring system will make low-cost GPS navigation available for many applications where the integrity requirements have been too great for GPS otherwise to have been acceptable. Examples which can be mentioned are marine seismic data acquisition, critical operations offshore, aircraft navigation, particularly in connection with approach and landing, navigation of aircraft during taxiing and harbour navigation for boats.

I claim:

1. A method of integrity monitoring in position determination by means of Global Positioning System (GPS), wherein there is employed a monitor station (M) with a first GPS receiver, provided at a location with a known geographical position, and a user location (F) with a second GPS receiver, the integrity of whose geographical position has to be monitored, characterised by transferring first GPS-based position measurement results obtained at the monitor station (M) on a communication line from the monitor station (M) to the user location (F);

determining a space vector between the location of the monitor station (M) and the user location (F) by means of second GPS-based position measurement results obtained at the user location (F) and said first GPS-based position measurement results obtained at the monitor station (M); and determining the degree of agreement among a GPS-based position measurement of the user location (F), the space vector and the known position of the monitor station (M), the degree of agreement being compared against a maximum error in the position for the user location (F) against which protection is desired.

2. A method according to claim 1, characterized in that said degree of agreement is determined by means of solid geometric or geodetic calculations.

3. A method according to claim 2, characterized in that the position of the user location (F) is determined by means of GPS signals and differential correction signals transferred from one or more reference stations (R) in a known position or known positions.

4. A method according to claim 3, characterized in that the differential corrections from the reference station or reference stations (R) are received by a receiver provided for this purpose at the user location (F).

5. A method according to claim 4, characterized in that there is provided an additional GPS receiver at the user location (F), with an associated additional antenna, thus duplicating the GPS receiver equipment at the user location (F) in order to be able to eliminate the effect of equipment error.

6. A method according to claim 5, characterized in that the position of the additional GPS receiver is determined relative to the position of the second GPS receiver, the second and the additional GPS receivers' antennae being arranged in such a manner that they receive different interference conditions due to multiple-path propagation.

7. A method according to claim 6, characterized in that the distance between the antennae of the two GPS receivers at the user location (F) is selected in order to enable position errors which are due to multiple-path propagation of the GPS signals to be identified, a corresponding space vector being calculated between the additional GPS receiver and the second GPS receiver.

8. A method according to claim 1, wherein the position determination is performed by means of differential GPS, characterized in that any ionospheric refraction of the GPS signals is corrected by employing GPS receivers which work on two frequencies, both in the monitor station (M) and in the user location (F).

9. A method according to claim 1, wherein the position determination is performed by means of DGPS, characterized in that any ionospheric refraction of the GPS signals is identified by arranging the monitor station (M) and the reference station or reference stations (R) in respective arcs which intersect each other in such a manner that the user location (F) is located in the segment between the said circular arcs.

10. A method according to claim 1, wherein the position determination has to be performed in another datum than that to which GPS refers, characterized in that a datum transformation is verified by means of integrity monitoring, any error in the position thus also being determined in the second datum.

* * * * *